US008411375B2

(12) United States Patent
Lenchenkov

(10) Patent No.: US 8,411,375 B2
(45) Date of Patent: Apr. 2, 2013

(54) METHOD AND APPARATUS PROVIDING GRADIENT INDEX OF REFRACTION LENS FOR IMAGE SENSORS

(75) Inventor: Victor Lenchenkov, Boise, ID (US)

(73) Assignee: Aptina Imaging Corporation, George Town (KY)

( * ) Notice: Subject to any disclaimer, the term of this patent is extended or adjusted under 35 U.S.C. 154(b) by 1469 days.

(21) Appl. No.: 12/020,324

(22) Filed: Jan. 25, 2008

(65) Prior Publication Data

US 2009/0190231 A1    Jul. 30, 2009

(51) Int. Cl.
*G02B 13/00* (2006.01)
(52) U.S. Cl. .......................................... 359/724; 359/642
(58) Field of Classification Search .................. 359/642, 359/724; 351/159, 168–171
See application file for complete search history.

(56) References Cited

U.S. PATENT DOCUMENTS

| 4,000,416 | A | * | 12/1976 | Goell ............................ 385/123 |
| 4,157,213 | A | * | 6/1979 | Phillips .......................... 351/168 |
| 4,643,752 | A | * | 2/1987 | Howard et al. ................. 65/399 |
| 4,645,523 | A | * | 2/1987 | Howard et al. ................. 65/385 |
| 5,299,272 | A | | 3/1994 | Buchin |
| 5,486,951 | A | * | 1/1996 | Hamblen ....................... 359/565 |
| 5,677,796 | A | | 10/1997 | Zimmerman et al. |
| 6,174,828 | B1 | | 1/2001 | Morita et al. |
| 6,576,355 | B2 | | 6/2003 | Yadav et al. |
| 6,728,456 | B1 | | 4/2004 | Aylward et al. |
| 2002/0164119 | A1 | | 11/2002 | Bryan et al. |
| 2004/0055340 | A1 | | 3/2004 | DiGiovanni et al. |
| 2006/0068412 | A1 | | 3/2006 | Tang |
| 2007/0034833 | A1 | | 2/2007 | Parce et al. |
| 2007/0069108 | A1 | * | 3/2007 | Inaba ........................ 250/208.1 |

FOREIGN PATENT DOCUMENTS

| EP | 1414070 A2 | * | 4/2004 |
| WO | WO 2007-106344 | | 9/2007 |

OTHER PUBLICATIONS

"Gradient Index Optics", Wikipedia, Jun. 12, 2006.
John Brown, et al. "Process in Dielectrics", vol. 2, 1960.
Brian T. Schwartz, et al., "Total External Reflection from Metalmaterials With Ultraflow Refractive Index", J. *Opt. Soc. Am. B.*, vol. 20, No. 12, Dec. 2003.
J. Y. Cheng et al., "Fabrication of Nanostructures with Long-Range Order Using Block Copolymer Lithography", *Applied Physics Letters*, vol. 81, No. 19, Nov. 2002.
Brian T. Schwartz, et al., "Waveguiding in Air by Total External Reflection From Ultraflow Index Metamaterials", vol. 85, No. 1, Jul. 5, 2004.
D.E. Aspnes, "Local Field Effects and Effective-Medium Theory: A Microscopic Perspective", *Am. Journal Phys.* Aug. 1982.

* cited by examiner

*Primary Examiner* — James Greece
(74) *Attorney, Agent, or Firm* — Kendall P. Woodruff

(57) ABSTRACT

A lens and its method of making. The lens includes a material having a lower index of refraction and a material having a higher index of refraction arranged in a pattern such that the lens has a gradient effective index of refraction.

20 Claims, 15 Drawing Sheets

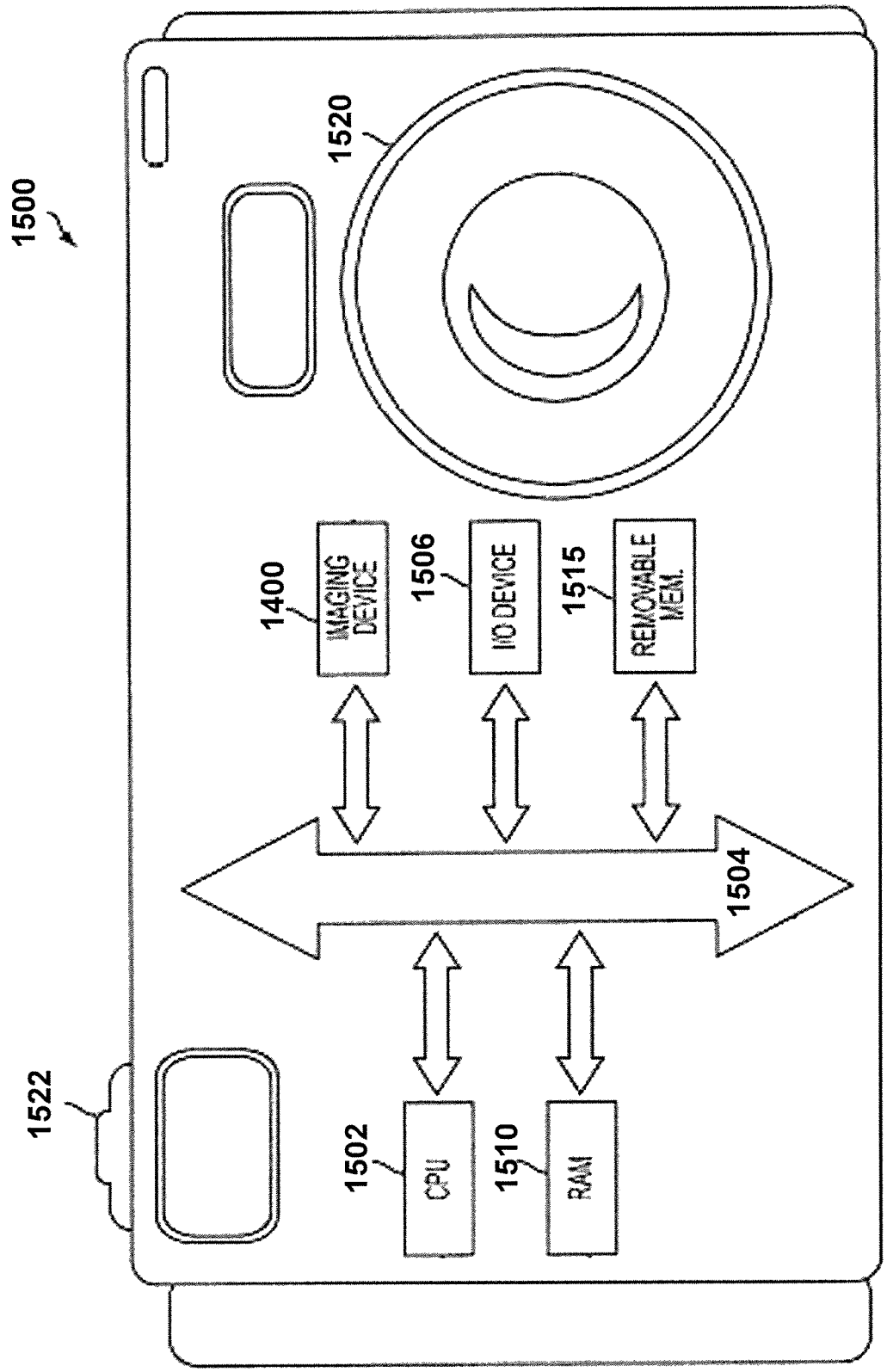

METHOD AND APPARATUS PROVIDING GRADIENT INDEX OF REFRACTION LENS FOR IMAGE SENSORS

FIELD OF THE INVENTION

Embodiments of the invention relate to a lens for refracting light and more specifically to a lens having a gradient index of refraction.

BACKGROUND OF THE INVENTION

Solid state imagers, including charge coupled devices (CCD) and CMOS sensors, are used in photo imaging applications. A solid state imager includes a focal plane array of pixels, each one of the pixels including a photosensor having a region for accumulating photo-generated charge. Microlenses are placed over the imager pixels and are used to focus light onto their respective photosensors. The use of microlenses significantly improves the photosensitivity of the imager by collecting light from a large light collecting area and focusing it on a small photosensitive area of the pixel. The ratio of the light collecting area to the overall area of the pixel is known as the "fill factor" of the pixel.

Optimally, all of the light from a pixel's microlens will be directed to the pixel's photosensitive area. However, in practice, a phenomenon known as crosstalk can result when off-axis light strikes a micro-lens at an obtuse angle and strikes the photosensitive region of an adjacent pixel. Crosstalk can degrade the quality of a captured image by causing a light reading that is too low in some pixels and too high in others.

Accordingly, it is desirable to have a lens that could significantly reduce crosstalk and improve the efficiency of a pixel.

BRIEF DESCRIPTION OF THE DRAWINGS

FIG. 15 is a block diagram of a processor system that includes an imaging device that includes micro-lenses according to embodiments described herein.

DETAILED DESCRIPTION OF THE INVENTION

Figure 1:
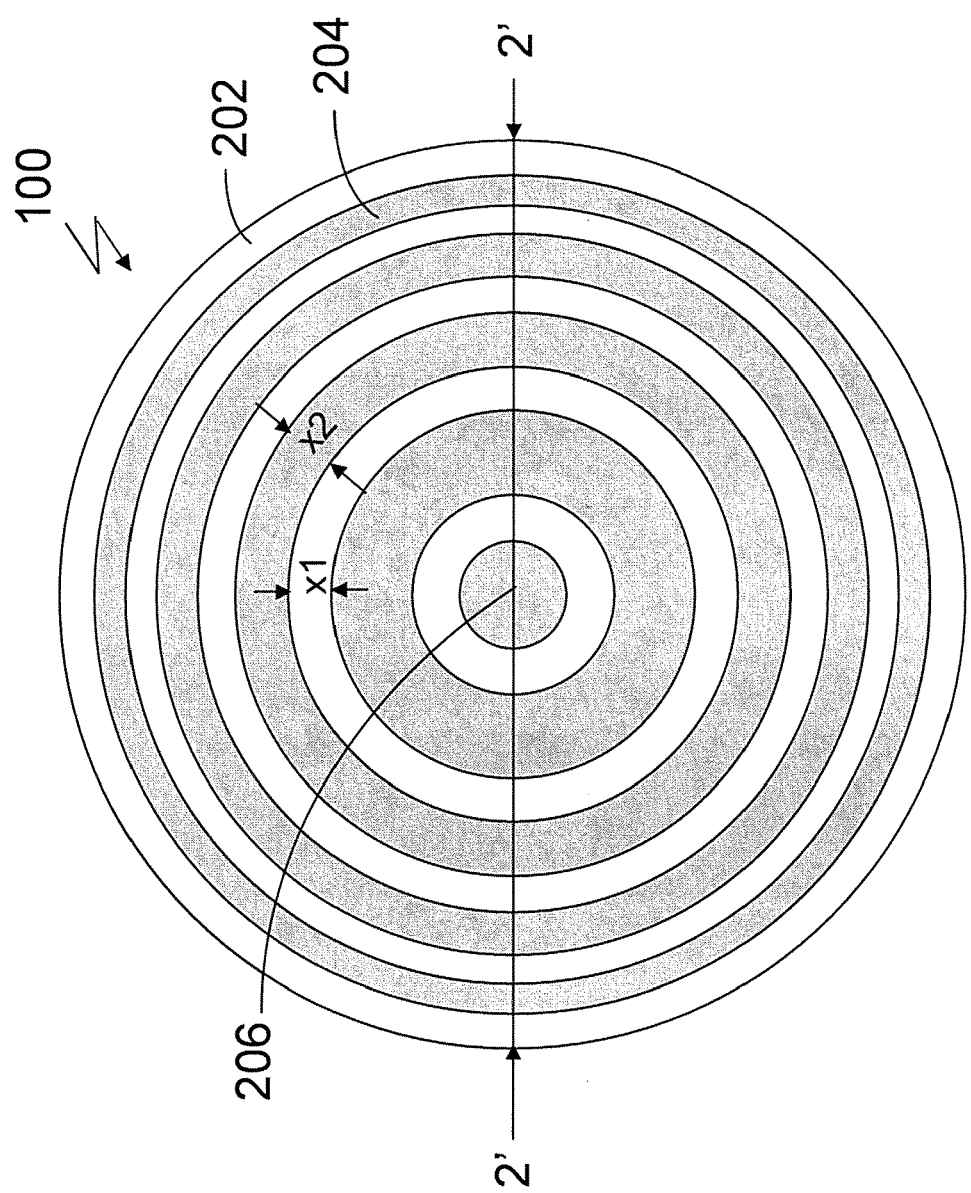
FIG. 1 is a top plan view of a lens according to an embodiment described herein.

In the following detailed description, reference is made to the accompanying drawings, which form a part hereof and illustrate specific embodiments in which the invention may be practiced. In the drawings, like reference numerals describe substantially similar components throughout the several views. These embodiments are described in sufficient detail to enable those skilled in the art to practice them, and it is to be understood that other embodiments may be utilized, and that structural, logical and electrical changes may be made. It should be noted that while the embodiments described herein are directed to microlenses for use in imaging devices, the invention is not so limited and may be applied more generally to other lens structures as well.

As described below in more detail below, the embodiments discussed herein relate to lenses having a gradient index of refraction due to the arrangement of lens material having a low index of refraction ("low index of refraction material") and lens material having a high index of refraction ("high index of refraction material"). The terms "low" and "high," as they relate to the index of refraction of a particular material, are used to describe the subjective relationship of the index of refraction of the particular material to another material. Therefore, the low index of refraction material has an index of refraction that is lower than the high index of refraction material, but may or may not have an index of refraction that is objectively "low."

The low index and high index of refraction material may be arranged in a subdiffraction pattern to form an effective index of refraction that varies according to the location on the lens forming a lens having a gradient index of refraction. The "effective index of refraction" is the actual index of refraction at a given location on the lens caused by the combination of the low index and high index of refraction material. A subdiffraction pattern is a pattern that is smaller than the shortest wavelength of light to be detected by a photosensor. The gradient index of refraction may be used to adjust the focal point of the lens to reduce crosstalk and to correct optical distortions, among other uses. Furthermore, the lenses described in the various embodiments below may be formed having a flat top and bottom surface and therefore may be more easily joined to adjacent layers in a device.

Figure 2:
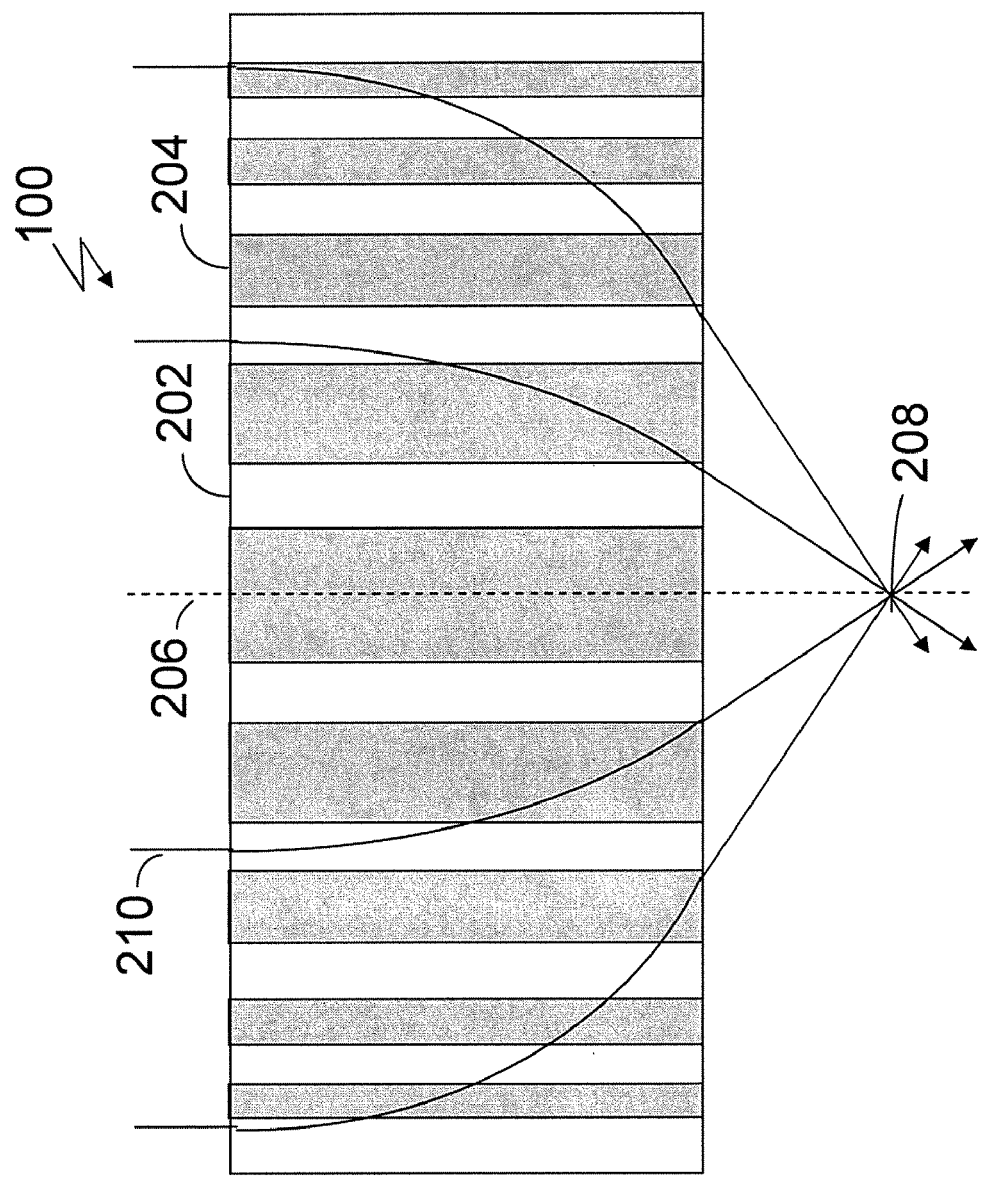
FIG. 2 is a cross-sectional view of the lenses of FIG. 1 and FIG. 3 taken along line 2'.

Referring now to the drawings, FIG. 1 illustrates a top plan view of a lens 100 according to an embodiment. FIG. 2 illustrates a cross-sectional view of the lens of FIG. 1 taken along line 2'-2'. The lens 100 is formed of a low index of refraction material 202 and a high index of refraction material 204. The low index of refraction material 202 and high index of refraction material 204 are arranged in concentric rings to form a dielectric material that is capable of refracting light.

The ratio of the amount of the low index of refraction material 202 to the high index of refraction material 204 is varied based on the distance from the center 206 of the lens 100. In the lens 100 shown in FIGS. 1 and 2, the ratio of the amount of low index of refraction material 202 to high index of refraction material 204 is adjusted by varying the width x2 of the high index of refraction material 204 according to the distance from the center 206 of the lens 100, while the width x1 of the low index of refraction material 202 is held constant, to achieve a gradient effective index of refraction. The effective index of refraction is the index of refraction achieved by the combination of the high index of refraction material 204 and the low index of refraction material 206.

A higher amount of high index of refraction material 204 relative to the low index of refraction material 202 results in a higher effective index of refraction. Conversely, a lower amount of high index of refraction material 204 relative to the low index of refraction material 202 results in a lower effective index of refraction. By arranging the high index of refraction material 204 and low index of refraction material 204 such that the highest effective index of refraction is located at the center 206 of the lens 100 and a lower index of refraction is located further away from the center 206 of the lens 100, the lens 100 can be made to focus incoming light 210 to a focal point 208 on a photosensitive region of a pixel. Conversely, if the high index of refraction material 204 and low index of refraction material 202 are arranged such that the lowest index of refraction is located at the center 206 of the lens 100 and a higher index of refraction is located further way from the center 206 of the lens 100, the lens will scatter incoming light 210.

In one embodiment, the lens 100 may be a micro-lens for use with a single pixel in an imaging device. The width x1 of the low index of refraction material 202 and the width x2 of the high index of refraction material 204 must be of a size such that the pattern is a subdiffraction pattern. The width x1 and x2 may each vary between approximately 5 nm to approximately 40 nm. For example, in one embodiment, to diffract light in the visible spectrum for a lens 100 having an effective index of refraction of 1.5, the width of the refraction material, either x1 or x2, forming a pattern may not exceed the optical flatness, which is approximately equal to (wavelength in vacuum)/((highest index of refraction)*10), or in this case, 400 nm/1.5*10, which equals approximately 26 nm. Having a pattern that does not have elements that exceed these determined dimensions suppresses diffraction effects because of the large difference in size between the pattern and the wavelength of visible light. In an image sensor pixel application, the effective electromagnetic field power concentration in certain regions is of primary importance, as opposed to the detail of the electromagnetic wavefront, and therefore the restriction on the width x1 of the low index of refraction material 202 and the width x2 of the high index of refraction material 204 in the pattern might be more relaxed. Although the embodiment shown in FIGS. 1 and 2 shows five rings of high index of refraction material 204, it should be understood that a greater or smaller number of rings of high index of refraction material 204 may be used so long as the widths x1, x2 form a subdiffraction pattern.

Although the embodiment described above discloses increasing the effective index of refraction according to a position on the lens 100 by varying the width of the high index of refraction material 204, it should be understood that the effective index of refraction may be modified by adjusting the dimensions of the high index of refraction material 204 and low index of refraction material 202 relative to each other in a variety of ways. For example, the width of the low index of refraction material 202 or the high index of refraction material 204 may be made smaller or larger while the width of the other material remains the same. As another example, the width of the low index of refraction material 202 or the high index of refraction material 204 may be made smaller or larger while the width of the other material is made larger or smaller, respectively. As yet another example, the width of the low index of refraction material 202 or the high index of refraction material 204 may be made smaller or larger while the width of the high index of refraction material 204 or low index of refraction material 202 is also made smaller or larger, respectively, so long as the ratio between the materials changes in a radial direction of the lens 100.

Figure 3:
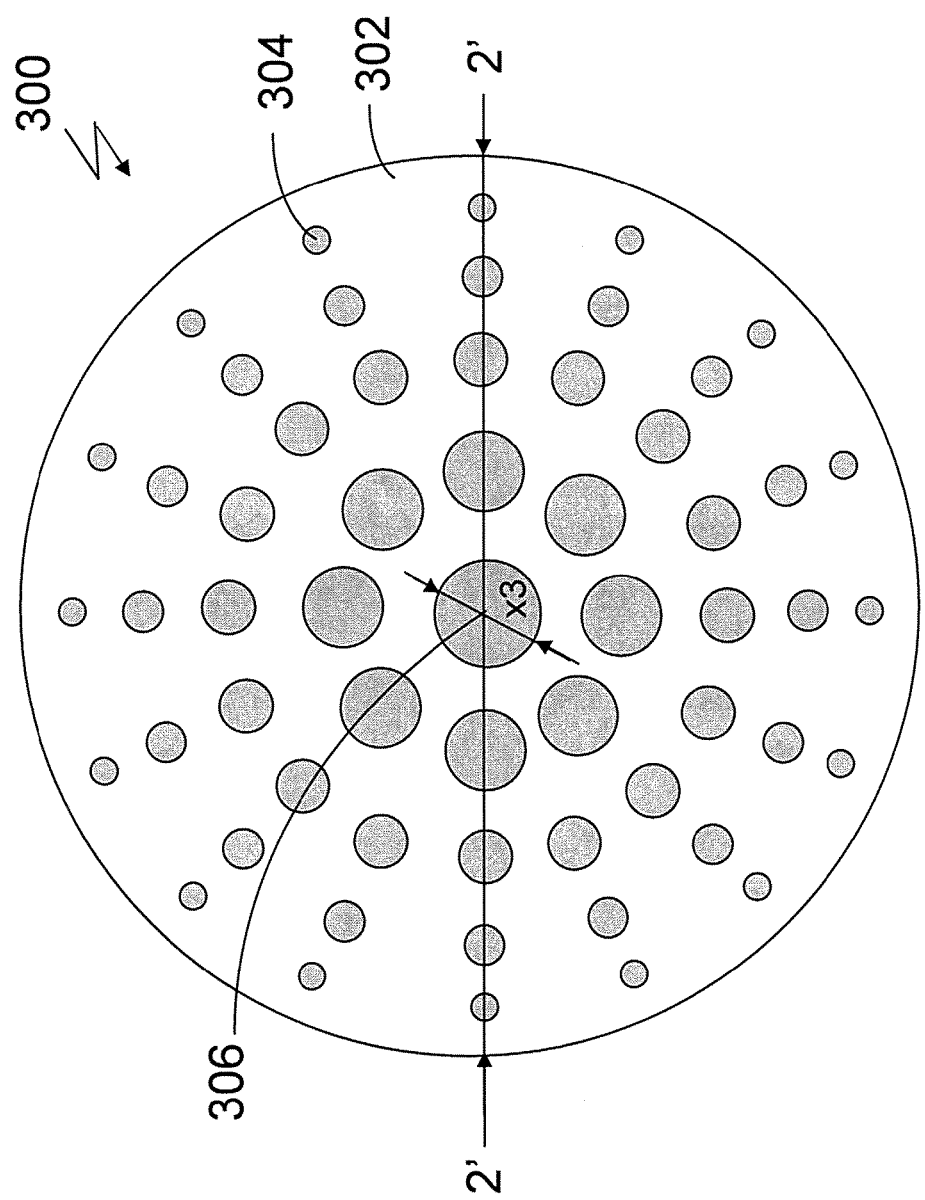
FIG. 3 is a top plan view of a lens according to an embodiment described herein.

FIG. 3 illustrates a top plan view of a lens 300 according to another embodiment. The lens 300 in FIG. 3 is includes columns of high index of refraction material 304 arranged within a low index of refraction material 302. In the lens 300 shown in FIG. 3, the ratio of the amount of low index of refraction material 302 to high index of refraction material 304 is adjusted by varying the width x3 of the cylindrical high index of refraction material 304 according to the distance from the center 306 of the lens 300 to achieve a gradient effective index of refraction. The width of the columns of high index of refraction material 304 may be adjusted relative to their position on the lens 300 to adjust the gradient of the index of refraction as desired. A cross-section of the lens 300 taken along line 2'-2' looks the same as the cross-section of lens 100 shown in FIG. 2. Although the embodiment shown in FIG. 3 shows columns of high index of refraction material 304 arranged in five rings, it should be understood that a greater or smaller number of rings and a greater or smaller number of columns within each ring may be used. Furthermore, the shape of the columns of high index of refraction material 304, in this and other embodiments, is not limited to a cylindrical shape and may have a cross-section in the shape of a square, rectangle, triangle, oval, or other shape.

Figure 4:
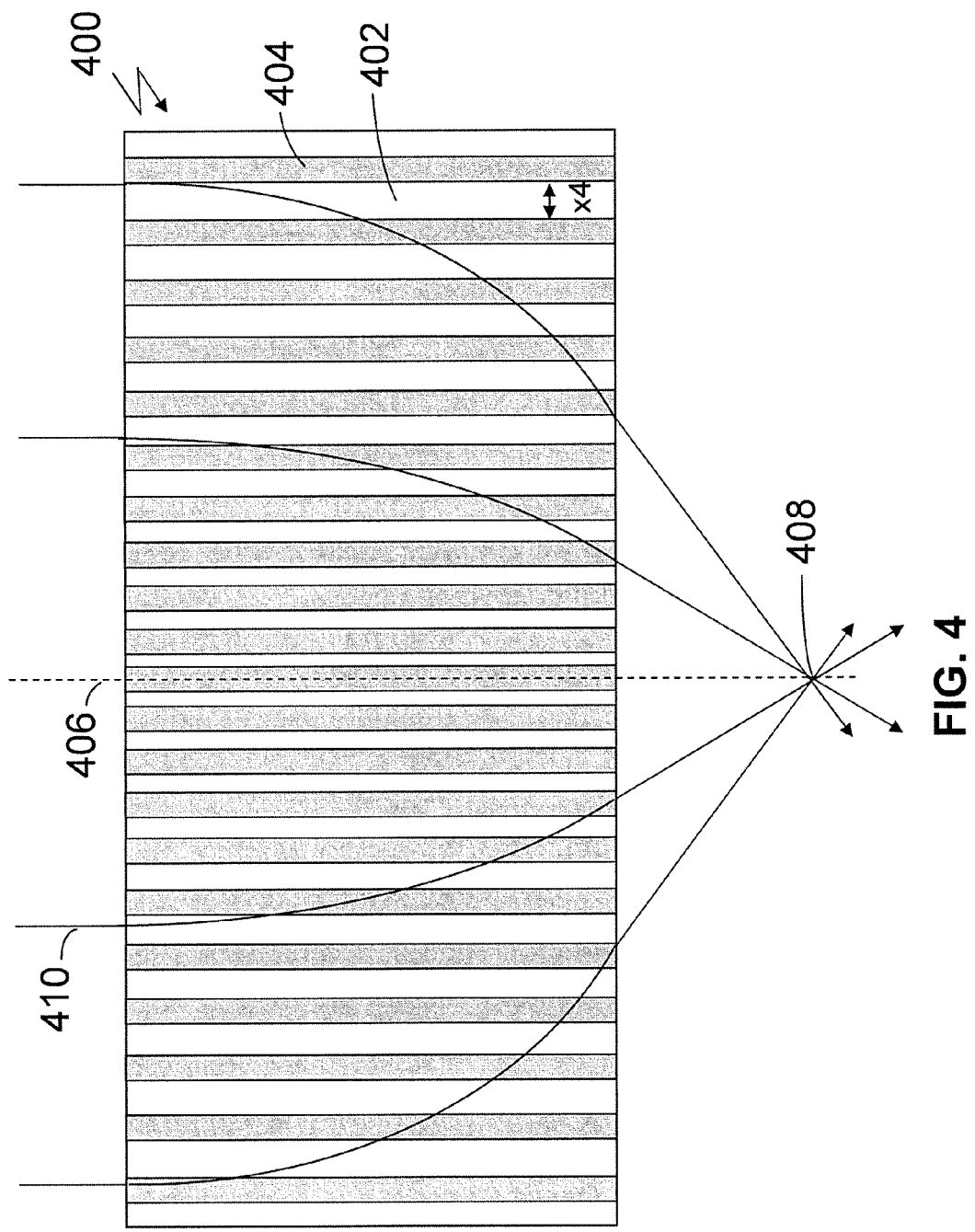
FIG. 4 is a cross-sectional view of a lens according to an embodiment described herein.

FIG. 4 is a cross-sectional view of a lens 400 according to another embodiment. The lens 400 includes columns of high index of refraction material 404 arranged within a low index of refraction material 402. In the lens 400 shown in FIG. 4, the ratio of the amount of low index of refraction material 402 to high index of refraction material 404 is adjusted by varying the width x4 of the distance between the columns of high index of refraction materials 404 according to the distance from the center 406 of the lens 400 to achieve a gradient effective index of refraction. Although the embodiment shown in FIG. 4 shows twenty one columns of high index of refraction material 404 in the cross-section, it should be understood that a greater or smaller number of columns may be used.

Figure 5:
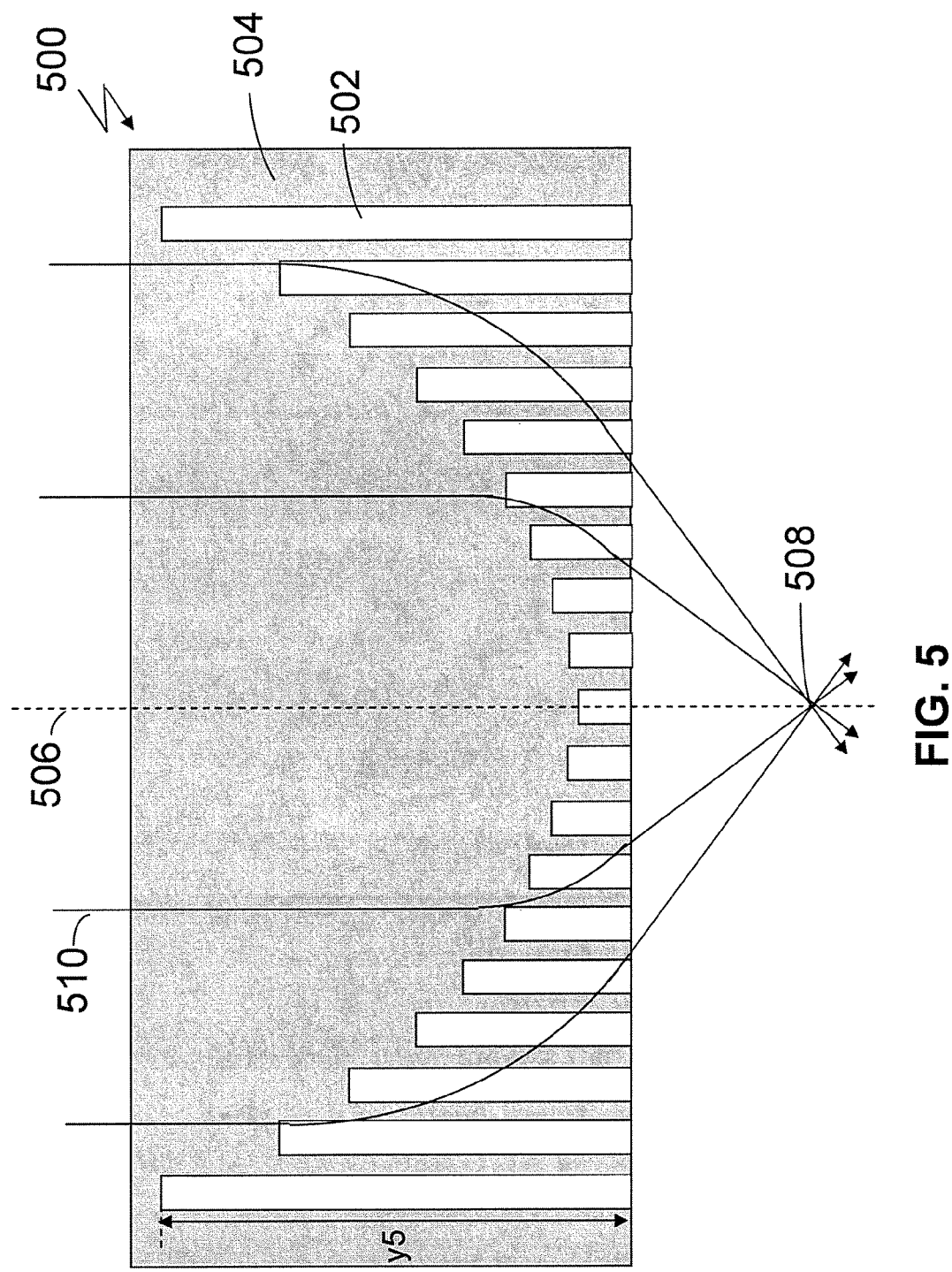
FIG. 5 is a cross-sectional view of a lens according to an embodiment described herein.

FIG. 5 is a cut-away side view of a lens 500 according to another embodiment. The lens 500 includes either columns or concentric rings of low index of refraction material 502 arranged within a high index of refraction material 504. In the lens 500 shown in FIG. 5, the ratio of the amount of high index of refraction material 504 to low index of refraction material 502 is adjusted by varying the height y5 of the columns or rings of the low index of refraction material 502 according to the distance from the center 506 of the lens 500 to achieve a gradient effective index of refraction. As with the other embodiments, a greater or lesser number of columns or rings of low index of refraction material 502 may be used.

Figure 6:
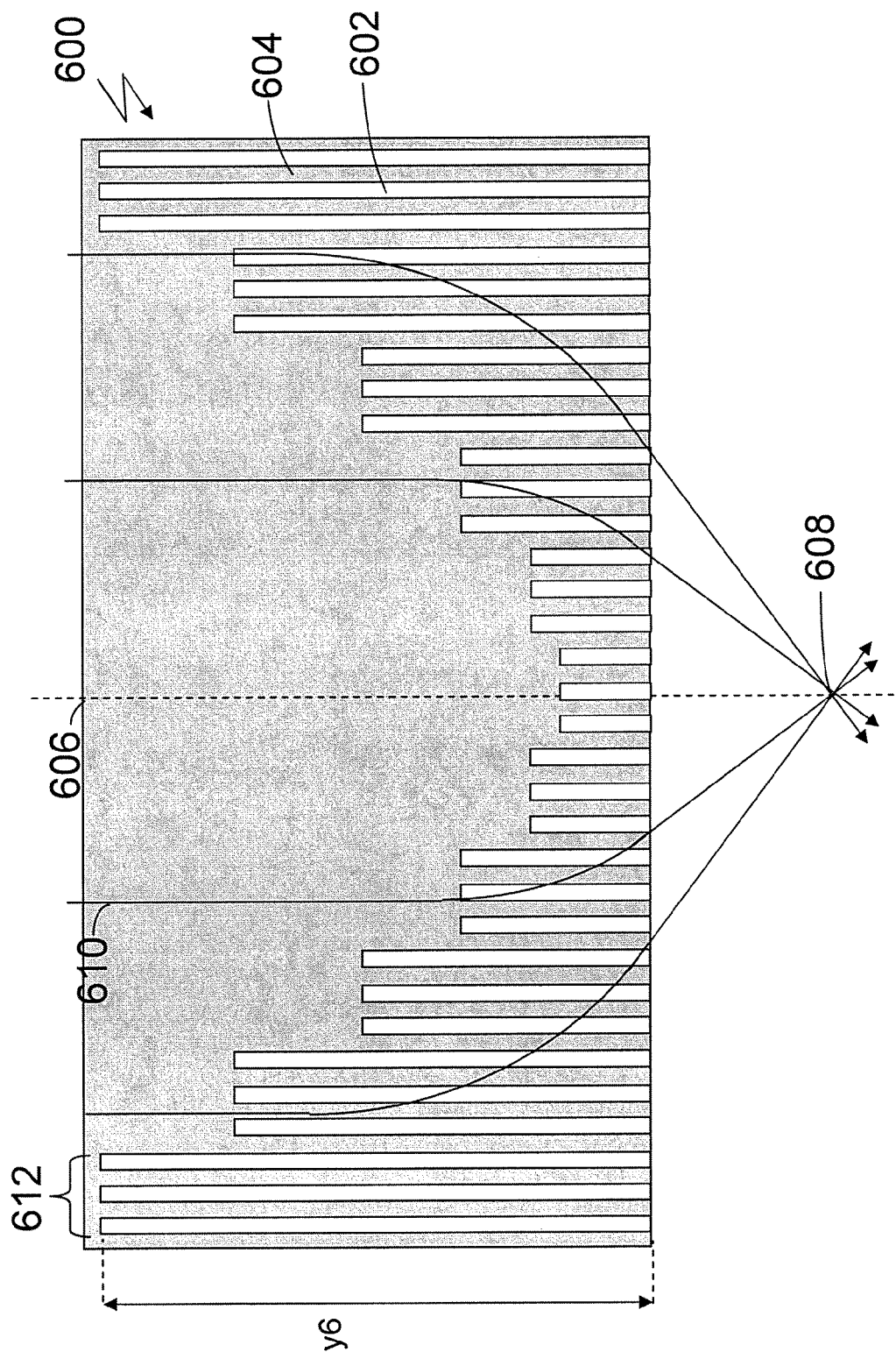
FIG. 6 is a cross-sectional view of a lens according to an embodiment described herein.

FIG. 6 is a cut-away side view of a lens 600 according to another embodiment. Similar to the lens 500 shown in FIG. 5, the lens 600 includes columns of low index of refraction material 602 arranged within a high index of refraction material 604 and the ratio of the amount of high index of refraction material 604 to low index of refraction material 602 is adjusted by varying the height y6 of the columns of low index of refraction materials 602 according to the distance from the center 606 of the lens 600 to achieve a gradient effective index of refraction. However, unlike the lens 500 of FIG. 5, in the lens 600 of FIG. 6, each column of low index of refraction material 602 is not taller than the column before it. Instead, the columns of low index of refraction material 602 are arranged in groups 612 of columns, each column in the group 612 having the same height y6. A lens 600 having groups 612 of columns having the same height y6 may be more easily fabricated since the columns require fewer columns of varying height. This same principle may be applied to the lenses depicted in FIGS. 1-4 by varying the widths x2, x3, x4 by groups of pattern features rather than for each respective feature.

Figure 7:
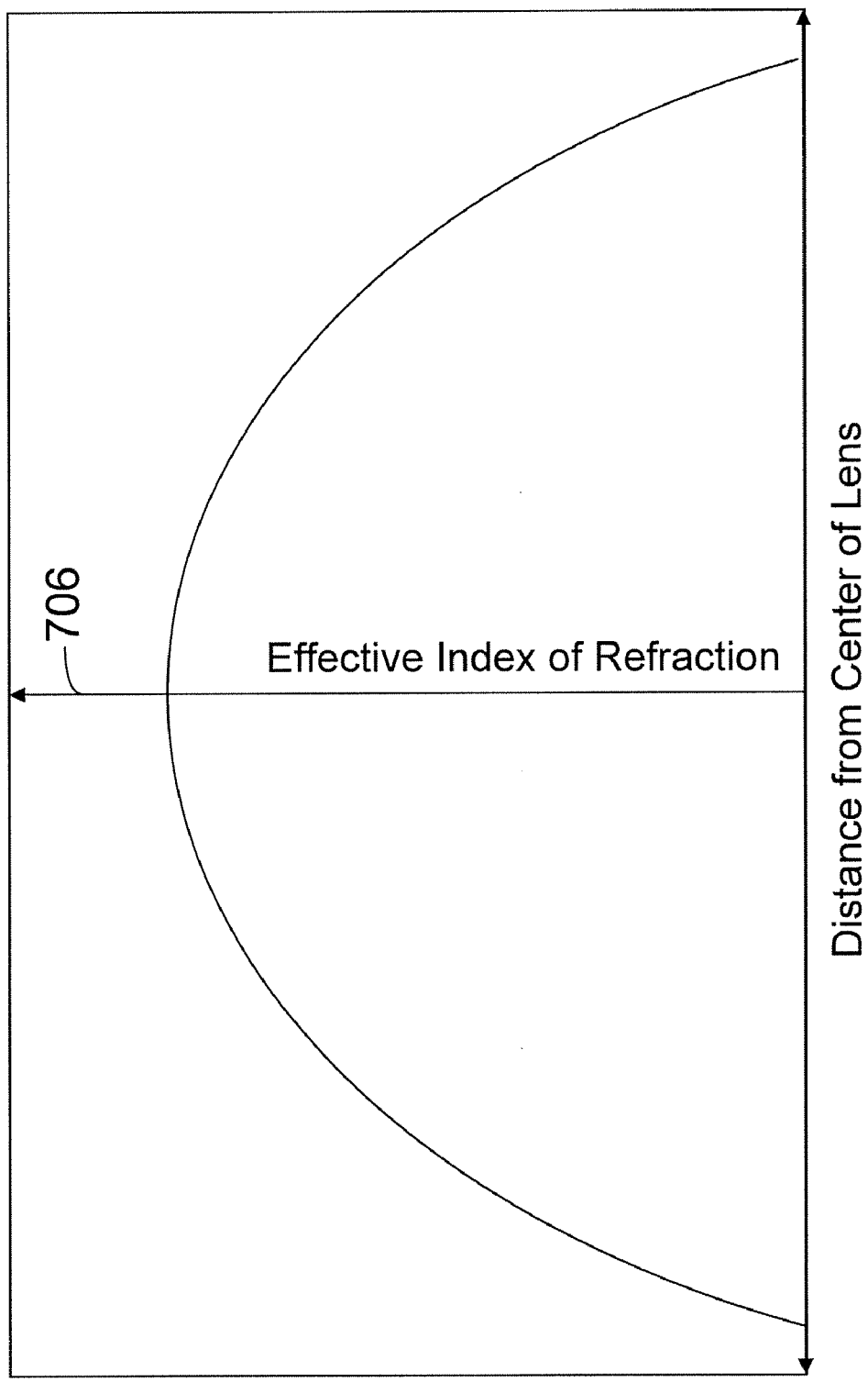
FIG. 7 is a graph of the index of refraction of a lens plotted against the distance from the center of the lens.

FIG. 7 is a graph of the effective index of refraction plotted against the distance from the center 706 of a lens having a gradient index of refraction. In FIG. 7, it can be seen that the effective index of refraction decreases non-linearly with respect to distance from the center 706 of the lens, e.g., in a parabolic or spherical shape. A lens of this type may be designed by, for example, employing a pattern which linearly increases the ratio of high index of refraction material to low index of refraction material from the outside edge to the center of the lens. The slope of the line, designating the change in the effective index of refraction at a given distance from the center 706 of the lens, may be adjusted for a given application. Furthermore, the shape of the line may have shapes other than parabolic or spherical depending on a desired application. The graph shown in FIG. 7 is similar to a graph that would represent the effective index of refraction plotted against the distance form the center of a lens for the lenses depicted in FIGS. 1-5, in which the width x of each index of refraction material is different from the index of refraction material adjacent to it.

Figure 8:
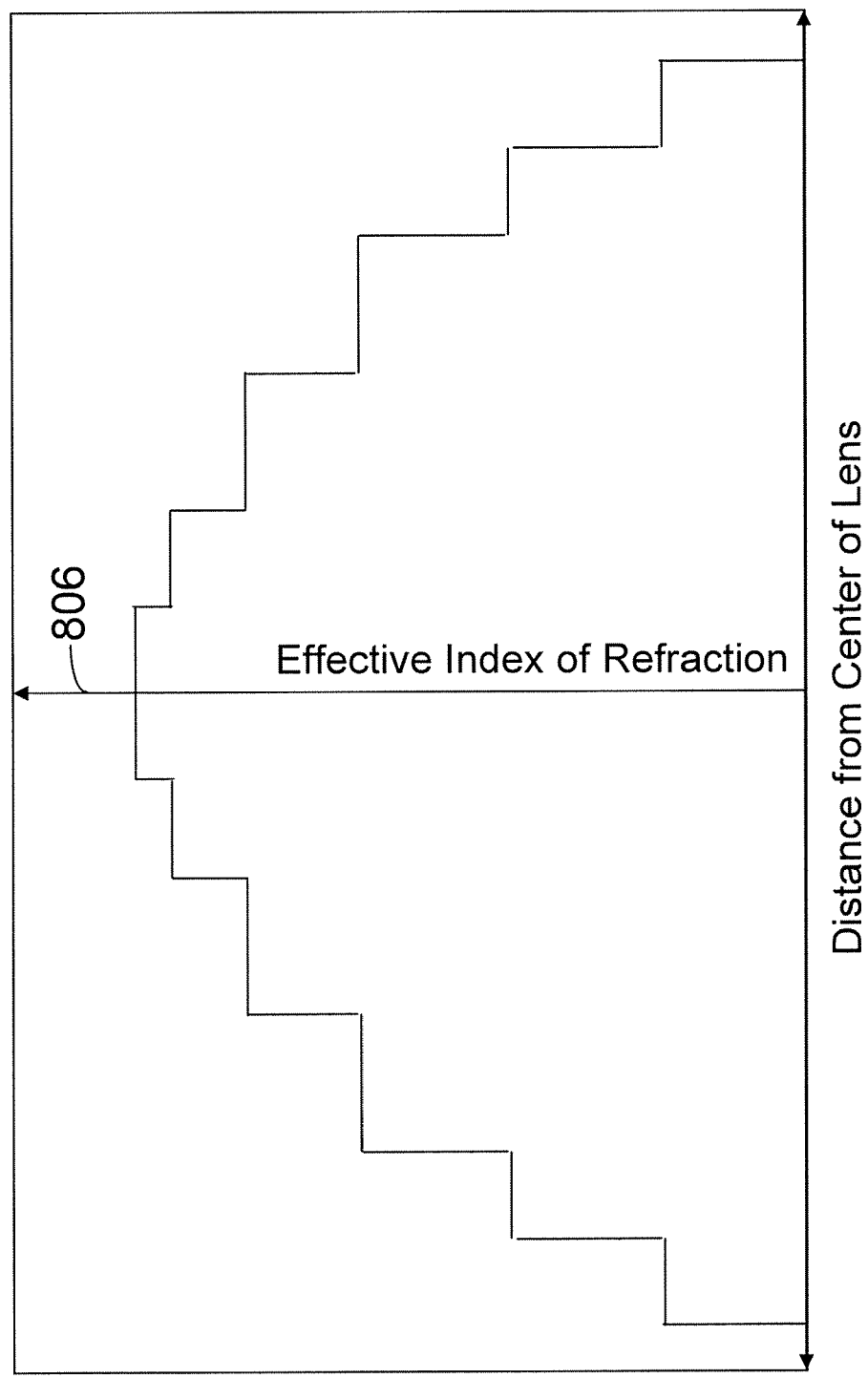
FIG. 8 is a graph of the index of refraction of a lens plotted against the distance from the center of the lens.

FIG. 8 is a graph of the effective index of refraction plotted against the distance from the center 806 of a lens having a gradient index of refraction. In FIG. 8, it can be seen that the effective index of refraction decreases in six steps on either side of the center 806 of the lens. A lens of this type may be designed, for example, by employing a pattern which increases the ratio of high index of refraction material to low index of refraction material in six different areas on each side of the center 806 of the lens. Of course, a fewer or greater number of steps may also be used. A lens having a stepped effective index of refraction may be more easily manufactured since it requires fewer changes in the pattern. The graph shown in FIG. 8 is similar to a graph that would represent the effective index of refraction plotted against the distance form the center of a lens for the lenses depicted in FIG. 6 in which the height x of the index of refraction material is varied by groups 612.

Although the embodiments described in FIGS. 1-8 illustrate lenses in which the effective index of refraction decreases with distance from the center of the lens, other embodiments are also possible. For example, the effective index of refraction may be increased with distance from the center to the periphery of the lens to scatter incoming light. In other embodiments, the effective index of refraction may alternately increase and decrease in varying amounts with respect to distance from the center of the lens to correct for various optical distortions, such as fish eye, barrel lens, and lens shading. In still other embodiments, the highest effective index of refraction may be located away from the center of the lens to change the lens effective shape. Furthermore, elements the various patterns described in the embodiments above, such as adjusting the height, width, spacing, of the columns or concentric rings, may be combined as desired to create a gradient index of refraction lens.

The lenses described above may be manufactured by embedding a material having a first index of refraction, known as the "guest" material, into a material having a different index of refraction, known as the "host" material. Either the low index of refraction material or the high index of refraction material may be the guest material with the other index of refraction material acting as the host material. A lens may be formed by forming openings of the appropriate width into the host material and filling the openings with the appropriate guest material. Examples of materials that may be used as either low or high index of refraction material include air, silicon dioxide, SiON, Al2O3 (n~1.7), Ge (for near infrared wavelengths), TiO2 (n~2.5), SnO2 (n~1.9), ZnO (n~2.0), ITO (n~2.0), SiC (n~2.6), Si (n~4), and SiN (n~2). As discussed above, the terms "low" and "high," as they relate to the index of refraction of a particular material, are used to describe the subjective relationship of the index of refraction of the particular material to another material. Therefore, for any two materials used together, the low index of refraction material will be the material having the lowest index of refraction of the two, while the high index of refraction material will be the material having the highest index of refraction of the two.

Figure 9A:
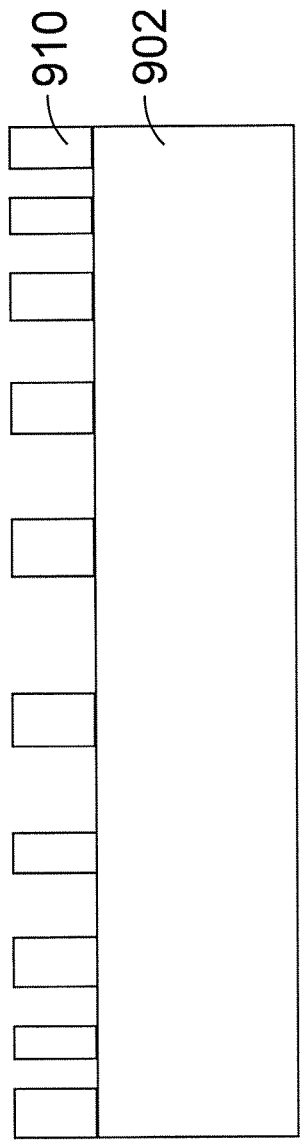
FIG. 9A-9C are cross-sectional views of a lens in stages of manufacture according to an embodiment described herein.
Figure 9B:
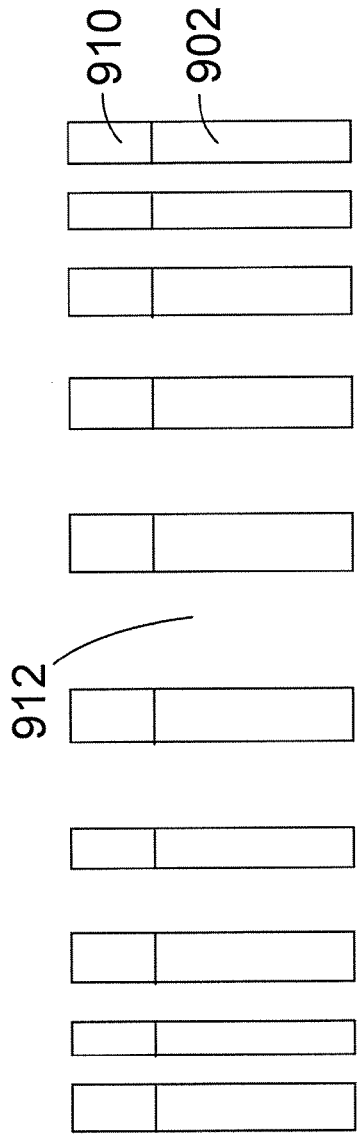

Turning to FIG. 9, one method of making a gradient index of refraction lens is described. As show in FIG. 9A, a photoresist 910 is applied to the host material 902 and patterned. The photoresist 910 is exposed and developed to expose portions of the host material 902 to be etched. As shown in FIG. 9B, the host material 902 is etched to form a series of openings 912. The openings 912 may be in the shape of concentric rings for the lens of FIG. 1, columns, for the lenses of FIGS. 3-6, or other shapes. The photoresist 910 is removed and the openings 912 are filed with the guest material 904. For ease of manufacturing, the index of refraction material most easily etched may act as the host material and the index of refraction material most easily formed in the openings may act as the guest material. An annealing step or steps may optionally be used to diffuse the openings to smooth the gradient index of refraction profile as a function of distance from the center of the lens. Furthermore, different materials may be mixed together allows to produce wafer level optics.

Figure 10A:
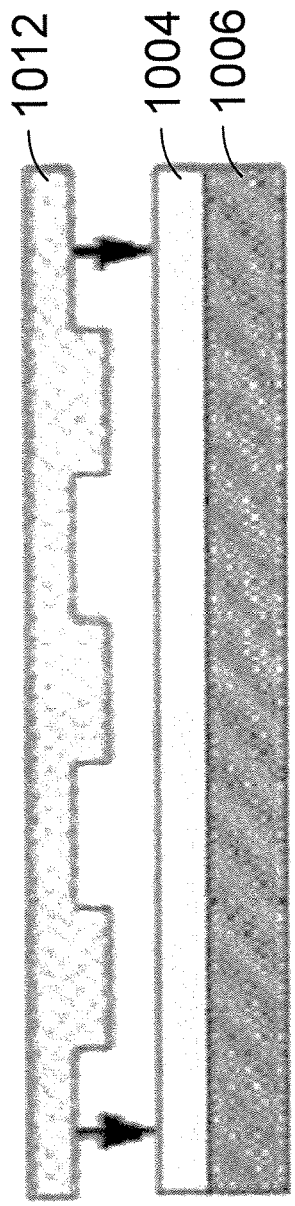
FIG. 10A-10C are cross-sectional views of a lens in stages of manufacture according to an embodiment described herein.
Figure 10B:
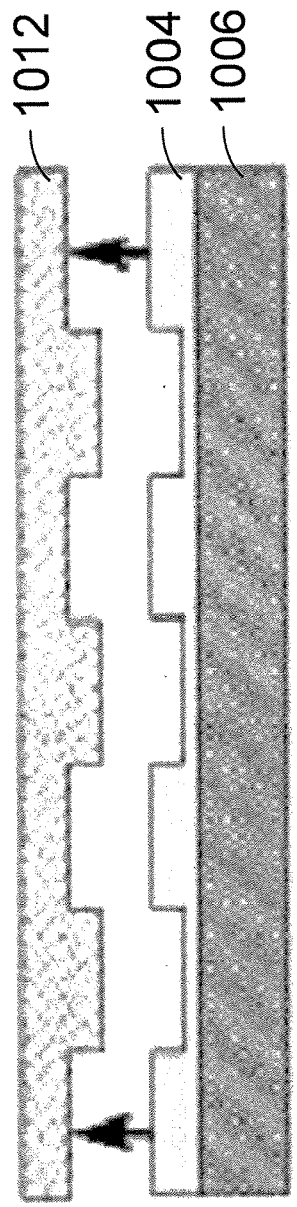

FIG. 10 is a diagram of another method of manufacturing a gradient index of refraction lens using a molding method. As shown in FIG. 10A, a layer of the host material 1004 is arranged on a substrate. A mold 1012 is applied to the host material 1004 to form a series of grooves. The shape of the mold 1012 will determine the pattern of the lens. The mold 1012 is then removed as shown in FIG. 10B. Anisotropic etching is performed to reduce the height of the host material 1004. If the guest material 1002 is to be air, the lens may be considered complete at this point. Alternatively, another guest material 1002 may be arranged in the openings.

Figure 9C:
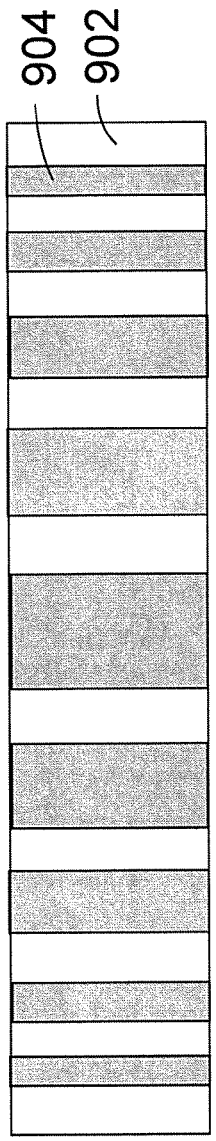
Figure 10C:
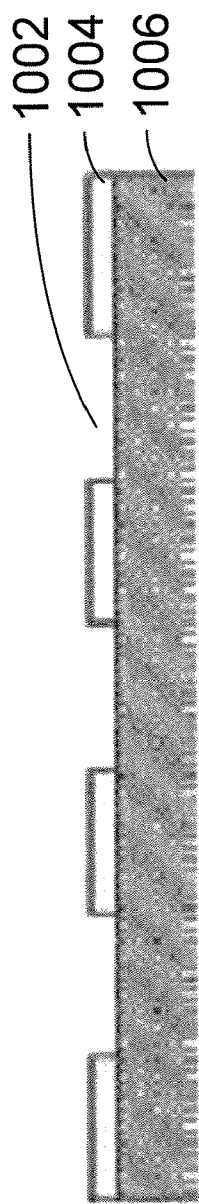

In another embodiment, the high index of refraction material, which may be used in the embodiments described above, may be in the form of nanoparticles, such as nanowires, embedded in a low index of refraction host material. For example, nanoparticles may form the high index of refraction concentric rings 204 or the cylinders 304, 404, 504, 604. The nanoparticles may be formed of a metal, such as gold and silver. The nanoparticles may be mixed with another material and may be applied to a preformed opening 912 as shown in FIGS. 9A-9C or may be molded as the guest material 1004 as shown in FIGS. 10A-10C.

Figures 11A, 11B:
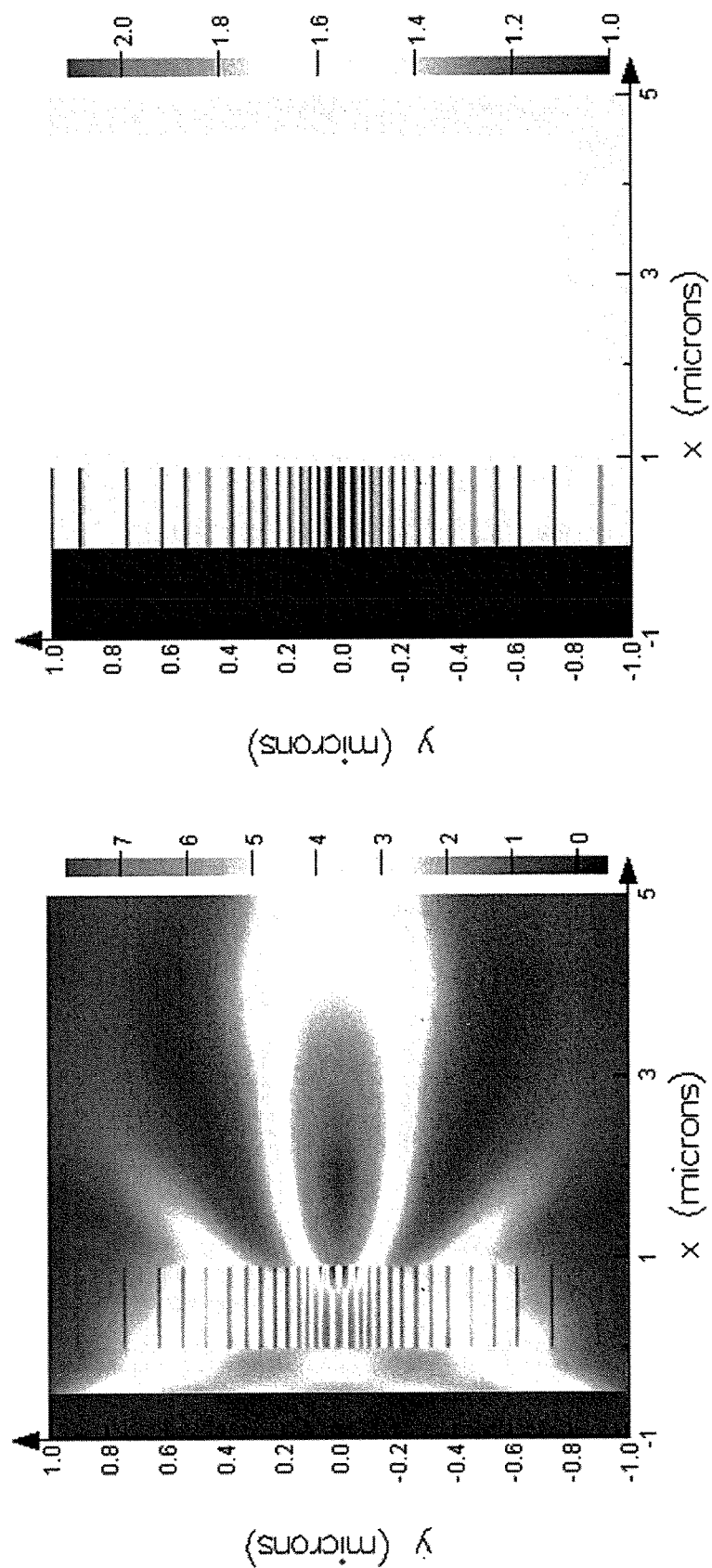
FIG. 11A is a graph of the distribution of light focused by a lens according to an embodiment described herein.
FIG. 11B is a map of the refractive index of a lens according to an embodiment described herein.

FIGS. 11A and 11B show a wave optics simulation of a gradient index of refraction lens having openings with a width x of 10-20 nm etched out of a host dielectric (n=1.5). The etched openings are filled with a guest dielectric (n=2.6). As shown in FIG. 11A, the lens focuses light to an area approximately 800 nm in diameter at a distance of five microns from the surface of the lens. FIG. 11B shows a refractive index map of the lens showing that the effective index of refraction is highest in the center of the lens and is lower at positions away from the center of the lens.

Figures 12A, 12B:
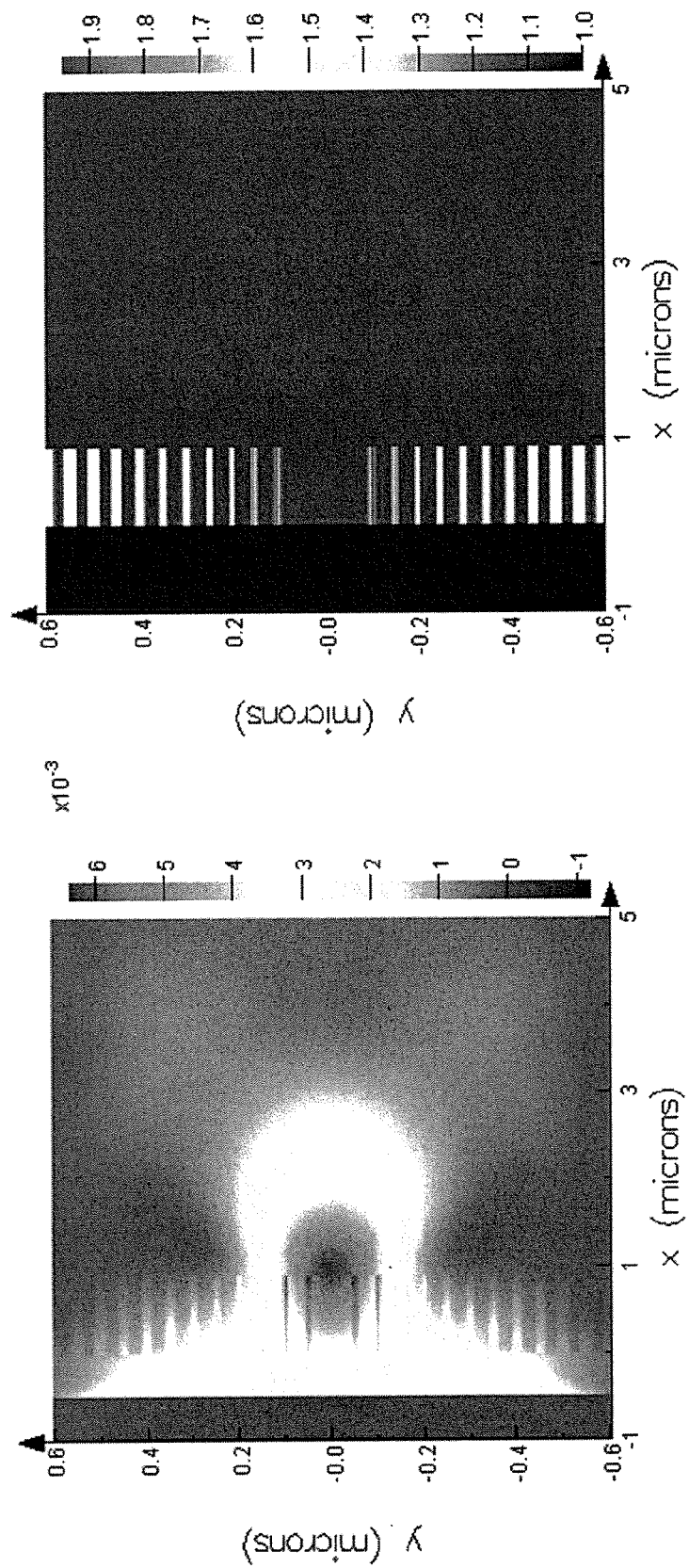
FIG. 12A is a graph of the distribution of light focused by a lens according to an embodiment described herein.
FIG. 12B is a map of the refractive index of a lens according to an embodiment described herein.

FIGS. 12A and 12B show a wave optics simulation of a gradient index of refraction lens having 10-20 nm openings etched out of a host dielectric (n=2.0). The etched openings are filled with a guest dielectric (n=1.6). As shown in FIG. 12A, the lens focuses light to an area approximately 450 nm in diameter at approximately 3 microns from the surface of the lens. FIG. 12B shows a refractive index map of the lens showing that the effective index of refraction is highest in the center of the lens and is lower at positions away from the center of the lens. A lens of this type could be used in a silicon nitride layer just before the silicon layer in an image sensor pixel.

Figures 13A, 13B:
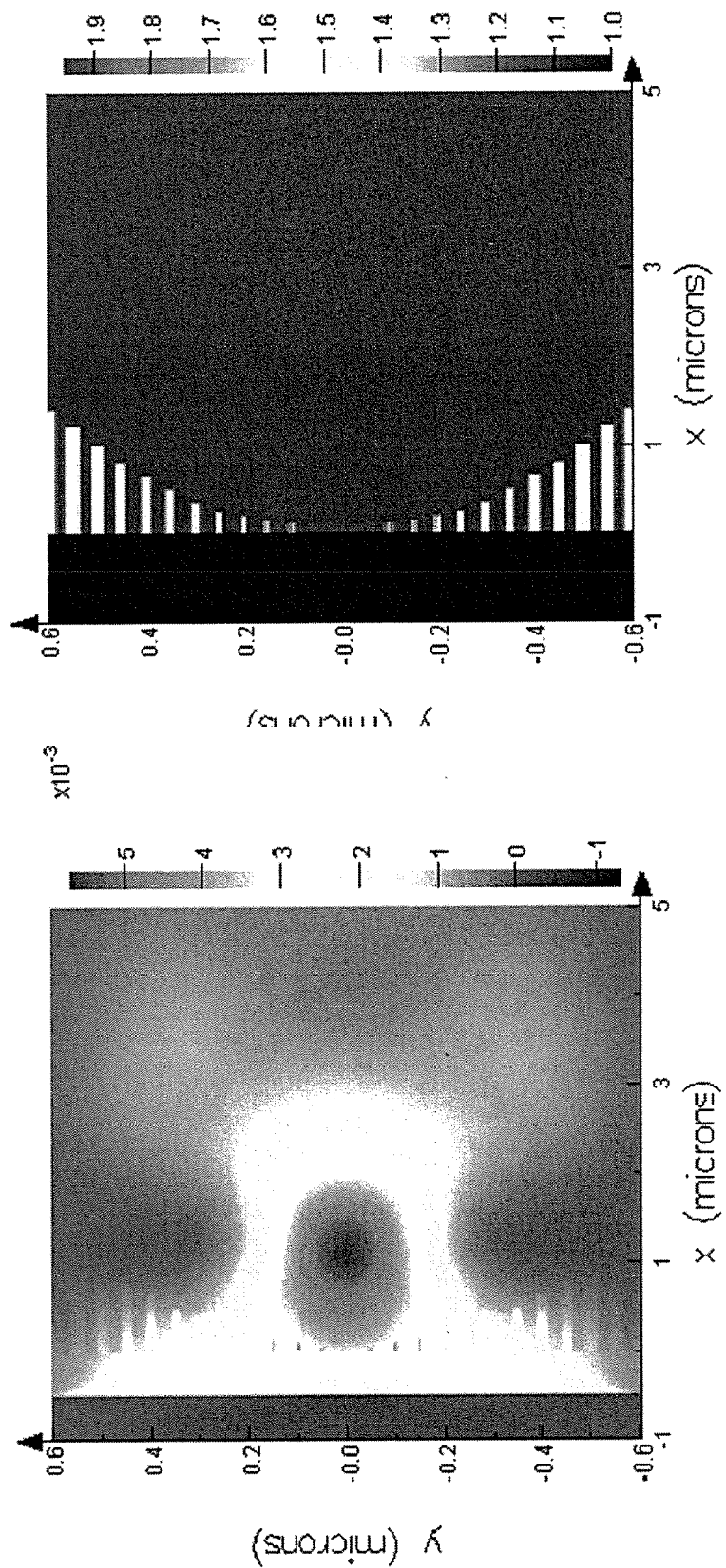
FIG. 13A is a graph of the distribution of light focused by a lens according to an embodiment described herein.
FIG. 13B is a map of the refractive index of a lens according to an embodiment described herein.

FIGS. 13A and 13B show a wave optics simulation of a gradient index of refraction lens having 10 openings with variable opening length etched out of a host dielectric. The etched openings are filled with a guest dielectric. As shown in FIG. 13A, the lens focuses light to an area approximately 450 nm in diameter at a distance of about 3 microns from the surface of the lens. FIG. 13B shows a refractive index map of the lens showing that the effective index of refraction is highest in the center of the lens and is lower at positions away from the center of the lens.

Figure 14:
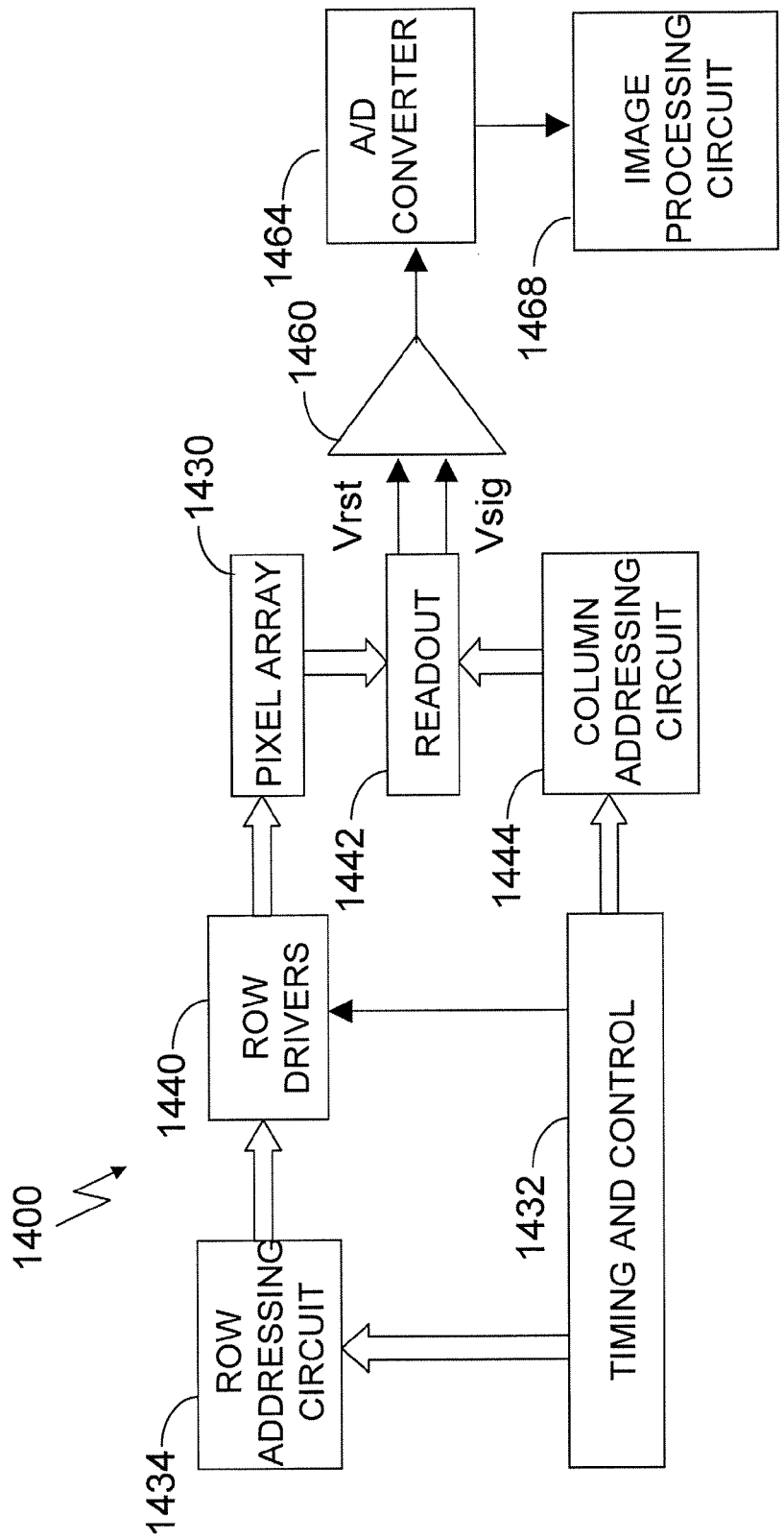
FIG. 14 is a block diagram of an imaging device that includes micro-lenses according to embodiments described herein.

FIG. 14 shows a block diagram of an imaging device 1400, e.g. a CMOS imaging device which may include microlenses, according to embodiments described herein, arranged over the photosensors of individual pixels in a pixel array 1430. A timing and control circuit 1432 provides timing and control signals for enabling the reading out of signals from pixels of the pixel array 1430 in a manner commonly known to those skilled in the art. The pixel array 1430 has dimensions of M rows by N columns of pixels, with the size of the pixel array 1430 depending on a particular application.

Signals from the imaging device 1400 are typically read out a row at a time using a column parallel readout architecture. The timing and control circuit 1432 selects a particular row of pixels in the pixel array 1430 by controlling the operation of a row addressing circuit 1434 and row drivers 1440. Signals stored in the selected row of pixels are provided to a readout circuit 1442. The signals read from each of the columns of the array sequentially or in parallel using a column addressing circuit 1444. The pixel signals corresponding to the pixel reset signal Vrst and image pixel signal Vsig are provided as outputs of the readout circuit 1442, and are typically subtracted in a differential amplifier 1460 and the result digitized by an analog to digital converter 1464 to provide a digital pixel signal. The digital pixel signals represent an image captured by pixel array 1430 and are processed in an image processing circuit 1468 to provide an output image.

FIG. 15 shows a processor system 1500 that includes an imaging device 1400 constructed and operated in accordance the various embodiment described above. The processor system 1500 is a system having digital circuits that include imaging device 1400. Without being limiting, such a system could include a computer system, camera system, scanner, machine vision, vehicle navigation, video phone, surveillance system, auto focus system, star tracker system, motion detection system, image stabilization system, or other image acquisition system.

Processor system 1500, for example a digital still or video camera system, generally comprises a central processing unit (CPU) 1502, such as a control circuit or microprocessor for conducting camera functions, that communicates with one or more input/output (I/O) devices 1506 over a bus 1504. Imaging device 1400 also communicates with the CPU 1502 over the bus 1504. The processor system 1500 also includes random access memory (RAM) 1510, and can include removable memory 1515, such as flash memory, which also communicates with the CPU 1502 over the bus 1504. The imaging device 4000 may be combined with the CPU processor with or without memory storage on a single integrated circuit or on a different chip than the CPU processor. In a camera system, a micro-lens 1520 according to various embodiments described herein may be used to focus image light onto the pixel array 1430 of the imaging device 1400 and an image is captured when a shutter release button 1522 is pressed.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above-described exemplary embodiments.

What is claimed as new and desired to be protected by Letters Patent of the United States is:

1. An imaging device comprising:
   a pixel array comprising a plurality of pixels, each pixel comprising:
      a photosensor, and
      a microlens arranged over the photosensor, wherein microlens comprises:
         a first material having a first index of refraction; and
         a second material having a second index of refraction, the first index of refraction being higher than the second index of refraction, wherein the first material and the second material are arranged in a pattern such that an effective index of refraction for the microlens is higher at a first position on the microlens than at a second position on the microlens and wherein the pattern is a subdiffraction pattern.

2. The imaging device of claim 1, wherein the pattern comprises alternating concentric rings of the first material and the second material.

3. The imaging device of claim 2, wherein a ratio of the width of a ring of the second material to the width of an adjacent ring of the first material is changed according to the distance of the rings from the center of the microlens.

4. The imaging device of claim 3, wherein the rings of the first material and the rings of the second material are arranged in groups, each ring of the first material within a group having a same width as every other ring of the first material within the group.

5. The imaging device of claim 2, wherein the width of the rings is between approximately 5 nm to approximately 40 nm.

6. The imaging device of claim 1, wherein the pattern comprises columns of the first material arranged in the second material or columns of the second material arranged in the first material.

7. The imaging device of claim 6, wherein the distance between the columns is changed according to the location of the columns on the microlens.

8. The imaging device of claim 6, wherein the size of the columns is changed according to the distance of the columns from a center point of the microlens.

9. The imaging device of claim 8, wherein the height of the columns is changed according to the location of the columns on the microlens.

10. The imaging device of claim 8, wherein the width of the columns is changed according to the location of the columns on the microlens.

11. The imaging device of claim 6, wherein the width of the columns is between approximately 5 nm to approximately 40 nm.

12. The imaging device of claim 1, wherein the first material is arranged in a plurality of openings arranged in the second material.

13. The imaging device of claim 1, wherein the second material is arranged in a plurality of openings arranged in the first material.

14. The imaging device of claim 1, wherein the first material comprises nanoparticles.

15. The imaging device of claim 14, wherein the nanoparticles comprise nanowires.

16. The imaging device of claim 1, wherein the effective index of refraction is highest at a center of the microlens and is lower at a radial distance from the center.

17. An imaging device comprising: a pixel array comprising a plurality of pixels, each pixel comprising: a photosensor, and a microlens arranged over the photosensor, wherein the microlens comprises a first material having a first index of refraction and a second material having a second index of refraction, the first index of refraction being higher than the second index of refraction, wherein the first material and the second material are arranged in a subdiffraction pattern, and wherein the first material and the second material are arranged in concentric rings such that the effective index of refraction is higher at a first position on the lens than at a second position on the microlens, the first position being closer to a center of the microlens than the second position.

18. The imager device of claim 17, wherein rings of the first material are wider according to their radial distance from the center of the microlens.

19. An imager device comprising: a pixel array comprising a plurality of pixels, each pixel comprising: a photosensor, and a microlens arranged over the photosensor, wherein the microlens comprises a first material having a first index of refraction and a second material having a second index of refraction, the first index of refraction being higher than the second index of refraction, wherein the first material and the second material are arranged in a subdiffraction pattern, wherein the first material is arranged in columns within the second material or wherein the second material is arranged in columns within the first material, and wherein the size of the columns is changed according to the radial distance of a column to a center of the microlens such that the effective index of refraction is higher at a first position on the microlens than at a second position on the microlens, the first position being closer to a center of the microlens than the second position.

20. The imager device of claim 19, wherein the height or the width of the columns is increased according to their radial distance from the center of the microlens.

* * * * *